US007395361B2

(12) United States Patent
Schaffer et al.

(10) Patent No.: US 7,395,361 B2
(45) Date of Patent: Jul. 1, 2008

(54) APPARATUS AND METHODS FOR WEIGHTED BUS ARBITRATION AMONG A PLURALITY OF MASTER DEVICES BASED ON TRANSFER DIRECTION AND/OR CONSUMED BANDWIDTH

(75) Inventors: Mark Michael Schaffer, Cary, NC (US); Richard Gerard Hofmann, Cary, NC (US); Jaya Prakash Subramaniam Ganasan, Youngsville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 11/208,089

(22) Filed: Aug. 19, 2005

(65) Prior Publication Data

US 2007/0067528 A1    Mar. 22, 2007

(51) Int. Cl.
   *G06F 13/36* (2006.01)
(52) U.S. Cl. ........................... 710/116; 711/158
(58) Field of Classification Search ........... 710/107, 710/11, 114, 116, 117, 29, 33, 40, 41, 240, 710/244; 370/431, 464; 709/225, 232; 711/154, 711/158
   See application file for complete search history.

(56) References Cited

U.S. PATENT DOCUMENTS

| | | | | |
|---|---|---|---|---|
| 4,901,234 A | * | 2/1990 | Heath et al. | 710/40 |
| 6,223,244 B1 | * | 4/2001 | Downer et al. | 710/244 |
| 6,363,445 B1 | * | 3/2002 | Jeddeloh | 710/113 |
| 6,385,678 B2 | * | 5/2002 | Jacobs et al. | 710/113 |
| 6,415,369 B1 | * | 7/2002 | Chodnekar et al. | 711/158 |
| 6,513,089 B1 | | 1/2003 | Hofmann et al. | |
| 6,751,684 B2 | * | 6/2004 | Owen et al. | 710/29 |
| 7,065,595 B2 | * | 6/2006 | Drerup et al. | 710/117 |
| 2002/0002646 A1 | | 1/2002 | Jeddeloh | |
| 2004/0193767 A1 | | 9/2004 | Drerup et al. | |

OTHER PUBLICATIONS

"A real-time and bandwidth guaranteed arbitration algorithm for SoC bus communication" by Chen et al. (abstract only) Publication Date: Jan. 24-27, 2006.*

* cited by examiner

*Primary Examiner*—Clifford H Knoll
(74) *Attorney, Agent, or Firm*—Nicholas J. Pauley; John L. Ciccozzi; Thomas Rouse (57) ABSTRACT

A bus arbitration algorithm precisely controls the relative bus channel bandwidth allocated to each master device by considering the direction of, and/or the bus channel bandwidth consumed by, a bus transaction. At least one weighting register is associated with each master device; in one embodiment, one weighting register per bus channel. The register is periodically loaded with a proportionate share of the available bus bandwidth. Upon being granted a bus transaction on a bus channel, the corresponding weighting register is decremented by an amount that reflects the bus channel bandwidth consumed by the transaction, measured in amount of data transferred or number of bus data transfer cycles required to complete the transaction. In the case of equal initial allocation of relative bandwidth share, master devices that consume bus channel bandwidth will have relatively low priority; master devices that do not consume bus channel bandwidth retain relatively high priority.

42 Claims, 5 Drawing Sheets

APPARATUS AND METHODS FOR WEIGHTED BUS ARBITRATION AMONG A PLURALITY OF MASTER DEVICES BASED ON TRANSFER DIRECTION AND/OR CONSUMED BANDWIDTH

BACKGROUND

The present invention relates generally to the field of processors and in particular to a method of bus arbitration that considers data transfer direction and bus channel bandwidth consumption.

Portable electronic devices continue to increase in sophistication and computing power, providing ever-increasing functionality to users. Modern portable electronic devices may include wireless data and voice communications; photographic and video capture and playback; position determination and geographic routing; game-playing with sophisticated graphics; high-fidelity audio reception and playback; and the like. In the near future, portable electronic devices are anticipated to support ubiquitous ad hoc data communications (e.g., IEEE 802.11, Bluetooth, and the like), virtual reality user interfaces, and many other advances. In many cases, such diverse functionality is implemented with dedicated processing circuits, in addition to one or more main processors. For example, a graphics coprocessor, MPEG video en/decoder, GPS receiver processor and/or other dedicated processors may reside in a portable electronic device, and may share system resources, such as memory, user interface elements, and the like.

The efficient transfer of data between functional units is a fundamental operation of any digital system, including portable electronic devices. Transferring a program from disk to memory to a processor; sending data from a graphics engine to a frame buffer to a video display circuit; and sending input from a keypad, mouse or touch screen to a processor are all common examples of data transfer within a computing system.

Figure 1:
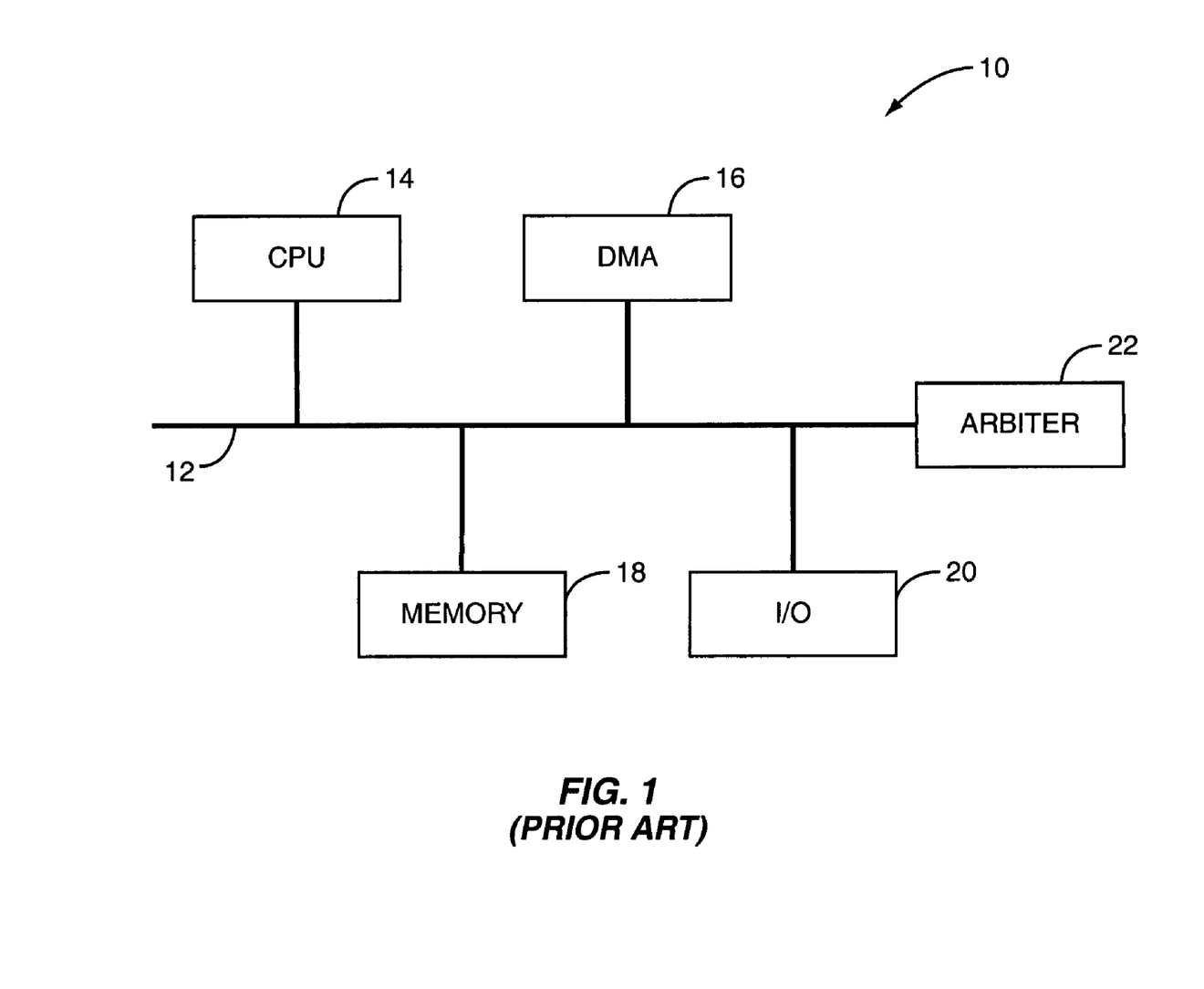
FIG. 1 is a block diagram of a prior art bus.

FIG. 1 depicts a simplified diagram of a well-known system bus architecture, indicated generally by the numeral 10. A system bus 12 interconnects system units. The system bus 12 may comprise address, data and control channels, and may perform bidirectional (e.g., read and write) data transfers. Master devices, such as the CPU 14 or a DMA engine 16, initiate data transfers across one or more channels of the bus 12—referred to herein as bus transactions—to or from slave devices, such as memory 18 and input/output circuits 20. When two or more independent masters 14, 16 are connected to the bus 12, their access to the bus is controlled by an arbiter 22.

As known in the art, one or more master devices 14, 16 assert a bus request to the arbiter 22. The arbiter 22 monitors activity on the bus 12, and when the bus 12 becomes available, sends a bus grant to one of the requesting master devices 14, 16. The granted master device 14, 16 may then initiate transactions across one or more channels of the bus 12, such as read or write cycles directed to one or more slave devices 18, 20.

Numerous bus arbitration algorithms are known in the art. Copending U.S. patent application Ser. No. 10/833,716, filed Apr. 27, 2004, assigned to the assignee of the present invention and incorporated by reference herein in its entirety, discloses a bus arbitration scheme in which each master device is initially assigned a programmable weighting. As each master device is granted access to the bus, its weighting register is decremented, effectively lowering the request priority of that master device relative to the other master devices with pending requests. The arbiter implements a weighted round-robin arbitration algorithm, wherein master devices with higher weightings have priority over master devices with a lower weighting, with a round-robin selection among master devices having the same weighting. Once all master devices have decremented their weighting registers to zero, a fair round-robin arbitration is implemented for the duration of a weighting interval, at the expiration of which all master devices are re-assigned their initial programmable weighting.

In one embodiment, two or more tiers of master devices may be defined. The programmable weighting of higher-tiered master devices may be updated at a frequency higher than that of lower-tiered master devices. Thus, as the master devices' weightings are decremented as each master device is granted a bus transaction cycle during the weighting interval, the higher-tiered master devices may be reset to their initial weightings on a more frequent basis, effectively giving the higher-tier master devices an overall higher priority.

This arbitration scheme is effective for sharing bus resources among multiple master devices in an equitable manner; master devices that access the bus only infrequently retain a higher priority, and devices that perform a large number of bus transactions quickly deplete their relative priority.

However, the number of bus transactions performed by a master device is only a rough approximation of that master device's consumption of available bus bandwidth. For example, a read burst comprising sixteen data transfer cycles, or "beats" (i.e., 128 bytes for a 64-bit data bus) consumes far greater bus bandwidth than does a byte read that requires only one bus beat. However, the above-described arbitration scheme would decrement a master device's weighting register the same amount in either case.

Additionally, modern high-performance busses may comprise independent read and write bus channels, with master devices utilizing the read and write bus channels in varying amounts. As the above-described arbitration algorithm does not take into account which channel a master device is utilizing, its arbitration weighting scheme does not accurately reflect a master device's actual bus bandwidth consumption.

SUMMARY

In one or more embodiments, a bus arbitration algorithm precisely controls the relative bus channel bandwidth allocated to each master device by considering the direction of, and/or the bus channel bandwidth consumed by, a bus transaction. At least one weighting register is associated with each master device; in one embodiment, one weighting register per bus channel. The register is periodically loaded with a proportionate share of the available bus bandwidth. Upon being granted a bus transaction on a bus channel, the corresponding weighting register is decremented by an amount that reflects the bus channel bandwidth consumed by the transaction, measured in amount of data transferred or number of bus data transfer cycles required to complete the transaction. In the case of equal initial allocation of relative bandwidth share, master devices that consume bus channel bandwidth will have relatively low priority; master devices that do not consume bus channel bandwidth retain relatively high priority.

One embodiment relates to a method of performing bus arbitration among a plurality of master devices. A proportionate share of bus bandwidth is allocated to each master device. Each master device's consumption of bus bandwidth is tracked by decrementing its allocated share in response to the length of bus transactions performed by the master device.

Each master device's remaining bandwidth share is used as a priority in arbitration for the bus.

Another embodiment relates to a method of performing arbitration among a plurality of master devices on a bus having separate transmit and receive channels. An arbitration priority is independently assigned for the transmit and receive channels to each master device. Each master device's transmit and receive channel priority is independently decremented in response to bus transactions performed by the master on each respective channel.

Another embodiment relates to a method of performing arbitration among a plurality of master devices on a bus having separate transmit and receive channels, where each master device is associated with a weighting register corresponding to each channel. The transmit channel weighting register and receive channel weighting register associated with each master device are loaded with a relative proportionate share of bandwidth on the respective channel. Arbitration is performed among master devices requesting bus transactions on the bus channels based on current bandwidth share as reflected by the contents of the weighting registers. When a master device is granted access to a bus channel, the weighting register corresponding to that channel, associated with the granted master device, is decremented by the bus channel bandwidth consumed in the granted bus transaction.

Another embodiment relates to an electronic device. The device includes a data transfer bus, at least two master devices connected to the bus in data transfer relationship, and at least one slave device connected to the bus in data transfer relationship. The device also includes an arbitration priority register associated with each master device, the arbitration priority register operative to be loaded with an initial value and operative to decrement, in response to the master device being granted a bus transaction on the bus, by an amount reflecting the bus bandwidth consumed by the bus transaction. The device additionally includes a bus arbiter operative to grant the bus to the requesting master device with the highest value in its associated arbitration priority register.

Another embodiment relates to an electronic device including at least two master devices and at least one slave device. The device includes a transmit bus channel operative to transfer information from a master device to a slave device and a receive bus channel operative to transfer information from a slave device to a master device. The device also includes an arbitration priority register for each of the transmit and receive bus channels associated with each master device. The arbitration priority register is operative to be loaded with an initial value and is operative to decrement in response to the master device being granted a bus transaction on the respective bus channel. The device further includes a bus arbiter operative to grant a bus channel to the requesting master device with the highest value in its associated arbitration priority register for that channel.

DETAILED DESCRIPTION

Figure 2:
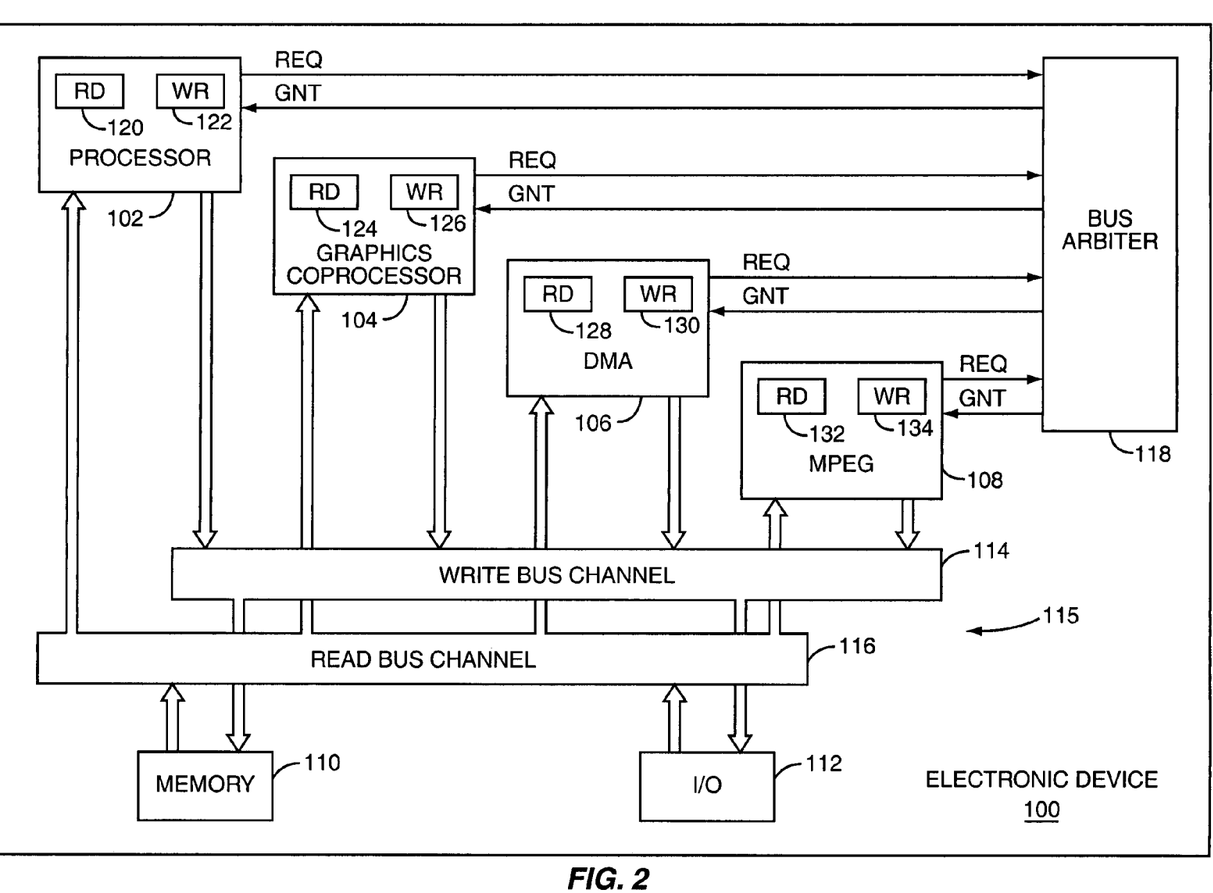
FIG. 2 is a functional block diagram of an electronic device.

FIG. 2 depicts an electronic device 100 having four master devices: a processor 102, a graphics coprocessor 104, a DMA engine 106, and an MPEG en/decoding engine 108. The depicted master devices are representative only; and electronic device 100 may include any number of master devices, having varied functionality. The master devices 102, 104, 106, 108 read from and write to representative slave devices such as memory 110 and I/O circuit 112. Data is transferred between master and slave devices across a system bus indicated generally by 115.

In the embodiment depicted in FIG. 2, the system bus 115 comprises a write bus channel 114, which transfers data from master devices 102, 104, 106, 108 to slave devices 110, 112. The system bus 115 additionally comprises a read bus channel 116, which transfers data from slave devices 110, 112 to master devices 102, 104, 106, 108. A separate address and control signal channel is omitted from FIG. 2 for clarity. The division of the system bus 115 into write channel 114 and read channel 116 is representative only, and is not limiting. For example, the address channel (not shown) may be unified with the write channel 114. Alternatively, the bus channels 114, 116 may be unified into a single, bi-directional channel.

Each master device 102, 104, 106, 108 transmits a request signal to the bus arbiter 118 when the master wishes to perform a bus transaction across the system bus 115. The bus arbiter performs arbitration among the master devices 102, 104, 106, 108, in this case for the two bus channels 114, 116, and issues an exclusive grant signal to one master device 102, 104, 106, 108 for each bus channel 114, 116. The depiction in FIG. 2 of request and grant signals is representative only. In any particular implementation, these logical signals may comprise any number of actual signal lines.

The processor 102 includes a read channel arbitration weighting register 120 and a write channel arbitration weighting register 122. Similarly, master device 104 includes read channel weighting register 124 and write channel weighting register 126; master device 106 includes a read channel weighting register 128 and a write channel weighting register 130; and master device 108 includes a read channel weighting register 132 and a write channel weighting register 134. The read channel weighting registers 120, 124, 128, 132 and write channel weighting registers 122, 126, 130, 134 implement an inventive bus arbitration mechanism that considers both the data transfer direction (i.e., which bus channel 114, 116) and the bus bandwidth consumed (i.e., the amount of data transferred across the relevant channel 114, 116) in performing bus 115 arbitration.

In many computing system, the write channel 114 and read channel 116 are not utilized equally. Rather, read channel 116 activity dominates. Furthermore, many master devices 102, 104, 106, 108 may have characteristically different utilization rates of the write channel 114 and read channel 116. For example, a graphics coprocessor 104 or MPEG decoder 108 that is directly coupled to a display may read a large volume of data from memory, but write relatively little. By separating the write channel 114 and read channel 16, and the corresponding write channel weighting registers 122, 126, 130, 134 and read channel weighting registers 120, 124, 128, 132, the relative arbitration priority of each master device 102, 104, 106, 108 may be separately controlled on each channel 114, 116, allowing for finer tuning of system performance.

According to one embodiment, the read channel 116 bandwidth is periodically proportionately allocated among master devices 102, 104, 106, 108 by the values written to the read channel weighting registers 120, 124, 128, 132, respectively.

For example, the read channel weighting register 120 may receive a value of forty, with the read channel weighting registers 124, 128 and 132 each receiving a value of twenty. This allocates 40% of the read channel 116 bandwidth to the master device 102, and allocates 20% of the read channel 116 bandwidth to each of the master devices 104, 106 and 108, for an arbitration interval of 100 read channel 116 bus beats.

When a requesting master device 102, 104, 106, 108 is granted a bus transaction on the read channel 116, that master device's read channel weighting register 120, 124, 128, 132 is decremented by an amount corresponding to the bandwidth of the read channel 116 consumed by the bus transaction. The priority of a master device 102, 104, 106, 108 in read channel 116 arbitration thus decreases as that master device consumes read channel 116 bandwidth by transmitting large amounts of data from slave devices 110, 112. Periodically, or alternatively when all of the weighting registers 120, 124, 128, 132 have expired, the registers may be reset to their initial values (or to a different relative proportionate share of the read channel 116 bandwidth).

In one embodiment, upon a master device 102, 104, 106, 108 being granted a read channel 116 bus transaction, the corresponding read channel weighting register 120, 124, 128, 132 is decremented by the size of the data transfer, such as in bytes. However, in this case, for a read bus channel 116 having a 64-bit wide data path, a transfer of anywhere from one to eight bytes will consume the same amount of bus channel 116 bandwidth—to wit, a single data transfer cycle, or "beat." As used herein, a data transfer cycle, or beat, is the duration required to transfer a datum across a bus channel 114, 116 from source to destination. Optimally, a bus beat comprises a single bus clock cycle; however, a single bus beat may span two or more bus clock cycles.

According to another embodiment, the actual bandwidth of the relevant bus channel 114, 116 consumed by a master device 102, 104, 106, 108 in a bus transaction is reflected in the master device's relative arbitration priority by measuring the consumed bandwidth in bus channel 114, 116 beats, rather than bytes. That is, master devices 102, 104, 106, 108 granted read channel 116 bus transactions to read from one to eight bytes would all decrement their read channel weighting register 120, 124, 128, 132 by one, as all of the bus transactions consume one beat of bandwidth in the read channel 116.

Thus, in one embodiment, as a master device 102, 104, 106, 108 is granted access to the read bus channel 116, its read channel weighting register 120, 124, 128, 132 is decremented by the number of beats across the read bus channel 116 required to complete the requested transaction. For example, a read of one to eight bytes, requiring one beat on the read bus channel 116, would decrement the relevant read channel weighting register 120, 124, 128, 132 by one. A burst of sixteen would decrement the relevant read channel weighting register 120, 124, 128, 132 by sixteen. In this manner, the arbitration priority weighting of each master device 102, 104, 106, 108 reflects both the relevant read channel 116 bandwidth initially allocated to that master device, as well as that master device's actual utilization of the read channel 116.

In operation, master devices 102, 104, 106, 108 that perform either long bursts or a large number of bus transactions on the read channel 116 (in either case, consuming the read channel 116 bandwidth) will have a lower arbitration priority relative the other master devices. Master devices 102, 104, 106, 108 that do not heavily utilize the read channel 116 will retain a higher priority for the read channel 116 relative to the master devices that do. This ensures that master devices 102, 104, 106, 108 have access to the read channel 116 commensurate with both their allocated relative proportional bandwidth share, and their actual consumption of bandwidth on the read channel 116.

Similarly, each master device 102, 104, 106, 108 is initially (and periodically) allocated a proportionate share of the write channel 114, by writing a value to the write channel weighting register 122, 126, 130, 134, respectively. A master device's initial priority with respect to the write channel 114 may differ from its initial priority with respect to the read channel 116. The write channel weighting register 122, 126, 130, 134 for each master device 102, 104, 106, 108 is decremented upon being granted a bus transaction on the write channel 114, in one embodiment by the number of beats required to complete the granted bus transaction. Hence, at any given time, a master device's relative priority on the write channel 114 and read bus channel 116 will reflect both its initial assigned relative bandwidth share, and its own actual utilization of bandwidth of the relevant bus channel 114, 116.

When all of the read channel weighting registers 120, 124, 128, 132 or write channel weighting registers 122, 126, 130, 134 associated with requesting master devices 102, 104, 106, 108 have the same value, arbiter 118 may switch to a round-robin arbitration algorithm. In particular, this may occur upon reloading the weighting registers 120-134, if all the master devices are assigned an equal proportionate bandwidth share of one or both channels 114, 116. Additionally, the round-robin arbitration may be employed when all of the read channel weighting registers 120, 124, 128, 132 or write channel weighting registers 122, 126, 130, 134 fully decrement to zero. The read channel weighting registers 120, 124, 128, 132 and write channel weighting registers 122, 126, 130, 134 may be updated to their initial values at the expiration of an arbitration interval, which may be measured in time or number of bus beats.

In one embodiment, one or more master devices 102, 104, 106, 108 may be defined as a higher-tier master device, and its read and write channel weighting registers 120-134 updated at a higher frequency than the other master devices. That is, the arbitration interval for higher-tier master devices may be shorter than the arbitration interval for lower-tier master devices. In general, any number of tiers may be defined, with corresponding associated arbitration intervals.

In this manner, both the direction (i.e., maintaining separate priorities for the write channel 114 and read channel 116) and consumed bandwidth (e.g., in beats) of each bus transaction are utilized to adjust the arbitration priorities of each master device 102, 104, 106, 108 on each bus channel 114, 116. This provides greater control over the relevant share of system bus 115 bandwidth allocated to each master device. The following table, depicting the contents of the read and write channel weighting registers 120-134 for each of four master devices (M0-M3), presents a representative example of the operation of the arbitration algorithm according to one embodiment:

The master devices are initially all allocated an equal 25% share of the bandwidth for both the read and write channels.

| M0 Rd | M0 Wr | M1 Rd | M1 Wr | M2 Rd | M2 Wr | M3 Rd | M3 Wr |
|---|---|---|---|---|---|---|---|
| 25 | 25 | 25 | 25 | 25 | 25 | 25 | 25 |
| | | | Read Channel | | | | |

Assume all four master devices simultaneously request bus transactions on the read channel, and maintain the requests (no master device -continued The master devices are initially all allocated an equal 25% share of the bandwidth for both the read and write channels.

requests a bus transaction on the write channel). When all weightings are equal, a round-robin arbitration algorithm determines which requesting master device is granted the channel.
M0 is granted a read burst of 8; M0 Rd (120) is decremented by 8:

| M0 Rd | M0 Wr | M1 Rd | M1 Wr | M2 Rd | M2 Wr | M3 Rd | M3 Wr |
|---|---|---|---|---|---|---|---|
| 17 | 25 | 25 | 25 | 25 | 25 | 25 | 25 |

M1 is granted a read burst of 4; M1 Rd (124) is decremented by 4:

| M0 Rd | M0 Wr | M1 Rd | M1 Wr | M2 Rd | M2 Wr | M3 Rd | M3 Wr |
|---|---|---|---|---|---|---|---|
| 17 | 25 | 21 | 25 | 25 | 25 | 25 | 25 |

M2 is granted a word read; M2 Rd (128) is decremented by 1 (the transaction consumes one beat on the read channel):

| M0 Rd | M0 Wr | M1 Rd | M1 Wr | M2 Rd | M2 Wr | M3 Rd | M3 Wr |
|---|---|---|---|---|---|---|---|
| 17 | 25 | 21 | 25 | 24 | 25 | 25 | 25 |

M3 is granted a read burst of 16; M3 Rd (132) is decremented by 16:

| M0 Rd | M0 Wr | M1 Rd | M1 Wr | M2 Rd | M2 Wr | M3 Rd | M3 Wr |
|---|---|---|---|---|---|---|---|
| 17 | 25 | 21 | 25 | 24 | 25 | 9 | 25 |

M2 has the highest priority for the read channel (it has consumed the least read channel bandwidth), and is granted a read burst of 12; M2 Rd (128) is decremented by 12:

| M0 Rd | M0 Wr | M1 Rd | M1 Wr | M2 Rd | M2 Wr | M3 Rd | M3 Wr |
|---|---|---|---|---|---|---|---|
| 17 | 25 | 21 | 25 | 12 | 25 | 9 | 25 |

Arbitration for the read channel will continue in this manner until all four master devices' read channel weighting registers are decremented to zero, when round-robin arbitration will resume, or until the expiration of the arbitration interval, when the read channel weighting registers will be re-loaded with their initial value.

Write Channel

Assume that all read channel requests are deasserted, and all master devices simultaneously request bus transactions on the write channel.
M0 is granted a write burst of 4 (round-robin for equal weightings); M0 Wr (122) is decremented by 4:

| M0 Rd | M0 Wr | M1 Rd | M1 Wr | M2 Rd | M2 Wr | M3 Rd | M3 Wr |
|---|---|---|---|---|---|---|---|
| 17 | 21 | 21 | 25 | 12 | 25 | 9 | 25 |

M1 is granted a write burst of 8; M1 Wr (126) is decremented by 8:

| M0 Rd | M0 Wr | M1 Rd | M1 Wr | M2 Rd | M2 Wr | M3 Rd | M3 Wr |
|---|---|---|---|---|---|---|---|
| 17 | 21 | 21 | 17 | 12 | 25 | 9 | 25 |

M2 is granted a write burst of 16; M2 Wr (130) is decremented by 16:

| M0 Rd | M0 Wr | M1 Rd | M1 Wr | M2 Rd | M2 Wr | M3 Rd | M3 Wr |
|---|---|---|---|---|---|---|---|
| 17 | 21 | 21 | 17 | 12 | 9 | 9 | 25 |

M3 is granted a byte write; M3 Wr (134) is decremented by 1 (one write channel beat):

| M0 Rd | M0 Wr | M1 Rd | M1 Wr | M2 Rd | M2 Wr | M3 Rd | M3 Wr |
|---|---|---|---|---|---|---|---|
| 17 | 21 | 21 | 17 | 12 | 9 | 9 | 24 |

M3 has the highest priority for the write channel (it has consumed the least write channel bandwidth), and is granted a word write; M3 Wr (134) is decremented by 1 (one write channel beat):

| M0 Rd | M0 Wr | M1 Rd | M1 Wr | M2 Rd | M2 Wr | M3 Rd | M3 Wr |
|---|---|---|---|---|---|---|---|

-continued

The master devices are initially all allocated an equal 25% share of the bandwidth for both the read and write channels.

| Rd | Wr | Rd | Wr | Rd | Wr | Rd | Wr |
|---|---|---|---|---|---|---|---|
| 17 | 21 | 21 | 17 | 12 | 9 | 9 | 23 |

Arbitration for the write channel will continue in this manner until all four master devices' write channel weighting registers are decremented to zero, when round-robin arbitration will resume, or until the end of the arbitration interval, when the write channel weighting registers are reloaded with their initial values.

In the above example, following arbitration for five read channel 116 transactions and five write channel 114 transactions, master device M3 (108), by virtue the bus 115 transactions granted to it, has the highest arbitration priority for the write channel 114, and the lowest arbitration priority for the read channel 116. Other master devices 102, 104, 106 have arbitration priorities for the bus channels 114, 116 that reflect their actual utilization of the channels 114, 116 (as in this example, their initially allocated proportionate bandwidth share for both channels 114, 116 was equal).

If all of the read channel weighting registers 120, 124, 128, 132 or the write channel weighting registers 122, 126, 130, 134 are depleted prior to the expiration of the arbitration interval, the arbiter 118 may implement a round-robin arbitration algorithm, or some other arbitration algorithm, as known in the art. In one embodiment, the reloading of the read channel weighting registers 120, 124, 128, 132 or the write channel weighting registers 122, 126, 130, 134 with their initial values may be triggered by all of the respective weighting registers fully decrementing, indicating that all master devices 102, 104, 106, 108 have fully consumed their allocated channel 114, 116 bandwidth share.

In one embodiment, the read channel weighting registers 120, 124, 128, 132 and write channel weighting registers 122, 126, 130, 134 are decremented by the number of beats in a bus 115 transaction upon the bus transaction being granted to the corresponding master device 102, 104, 106, 108 by the arbiter 118. Those of skill in the art will readily recognize that the weighting registers 120-134 may alternatively be decremented upon completion of the bus transfer, or as each beat of the bus transfer completes, in which case aborted or otherwise incomplete bus transactions would not decrement a master device's arbitration priority as if the bus transaction had completed. In addition, while FIG. 2 depicts the weighting registers 120-134 as being within the master devices 102-108, in alternate embodiments the weighting registers 120-134 may reside in the bus arbiter 118, in an interconnection matrix (not shown), or elsewhere within the electronic device 100.

In another embodiment, the channel weighting registers 120, 124, 128, 132 and write channel weighting registers 122, 126, 130, 134 are decremented only once for each granted bus 115 transaction. In this embodiment, each master device's 102, 104, 106, 108 utilization of the write channel 114 and read channel 116 is tracked separately; however, no distinction is made based on the length of a data transfer and hence actual bandwidth consumption is not considered. In still another embodiment, each master device 102, 104, 106, 108 includes only a single channel weighting register (not shown), which is decremented for each data transfer beat, regardless of whether the data transfer is a read or a write operation. In this embodiment, the master device's share of the total bus 115 bandwidth is tracked, and its arbitration priority adjusted accordingly, without regard to which channel (i.e., in which direction) the transfers occurred. This embodiment may be particularly suited to a system bus having a unified data bus, such as that depicted in FIG. 1, in which both read and write transfers use the same data lines.

The electronic device 100 described above and depicted in FIG. 2 utilizes a separate write channel 114, read channel 116, and address channel (not shown). In various embodiments, the arbitration algorithm that considers transfer direction and/or bandwidth consumed may be advantageously applied to a variety of bus structures. For example, copending U.S. patent application Ser. No. 10/921,053, filed Aug. 17, 2004, assigned to the assignee of the present invention and incorporated by reference herein in its entirety, discloses a bus architecture for system-on-a-chip (SOC) designs that uses a common bus architecture and signaling protocol that is independent of the bandwidth requirements of a particular implementation of the bus. This architecture is referred to herein as a scalable bus architecture.

The scalable bus architecture is scalable in both bus width and clock frequency, and its signaling protocol is independent of any higher-level bus protocol that is used. This is achieved by reducing the signaling protocol of the bus to only the necessary signals that are required to either transmit or receive information across the bus. Removing the higher-level protocol specifics from the signaling protocol itself allows any bus architecture to be implemented using the same fundamental signaling protocol. In addition, the scalability of this architecture allows for a variety of implementations using the same signaling protocol.

Prior art on-chip bus architectures often comprise an address bus, transfer qualifier bus, write data bus, write data bus enables, and a read data bus. Each of these busses can be implemented as an independent channel with its own signaling protocol, bus width, and transfer protocol. Each bus channel includes a handful of control signals that allow the necessary handshaking to control the flow of data across the bus.

Figure 3:
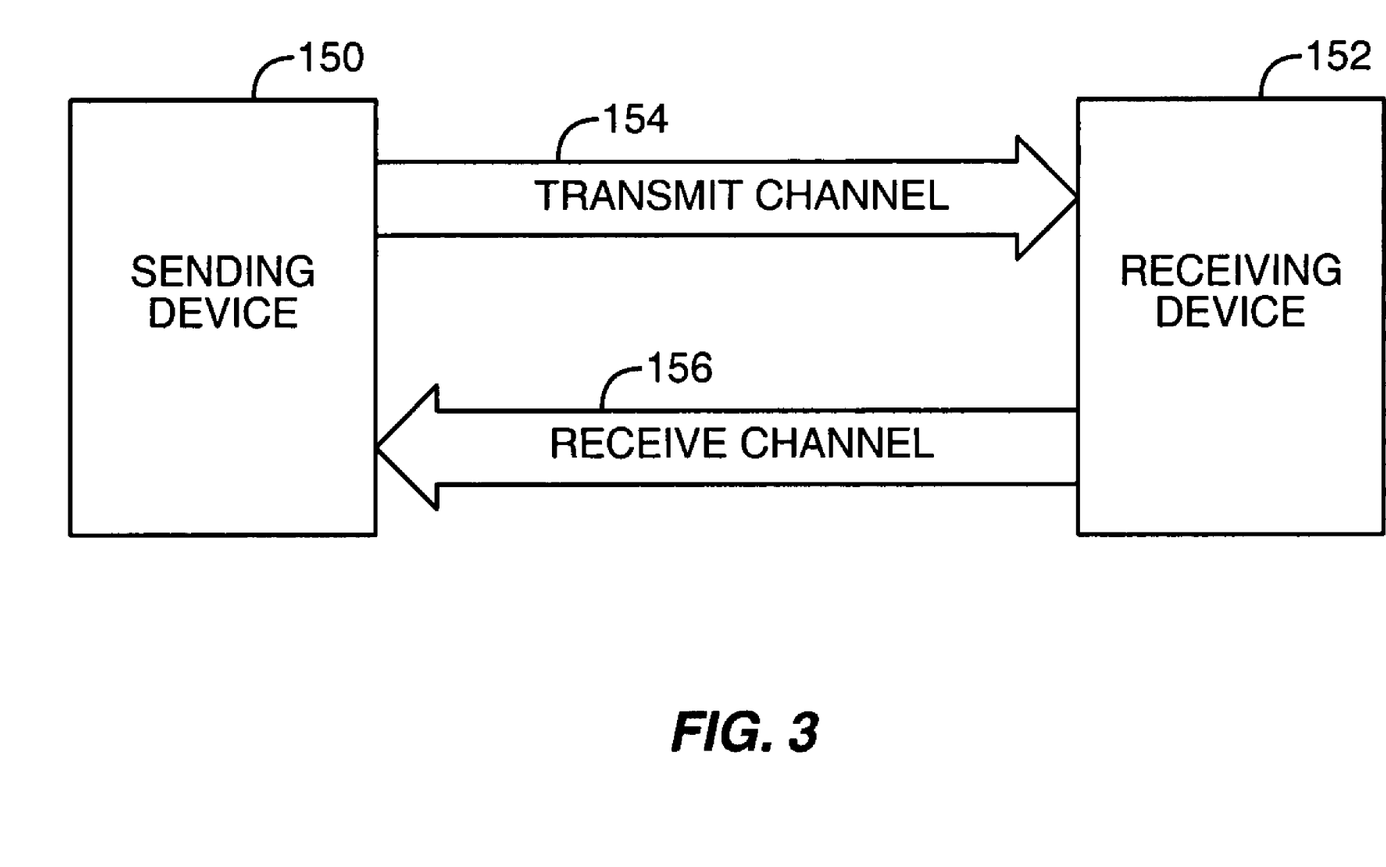
FIG. 3 is a block diagram of a scalable bus architecture.

In the scalable bus architecture, depicted in FIG. 3, the address, transfer qualifiers, write data, and write data enables are all considered information that is transferred from a sending device 150 to a receiving device 152. This information is all transferred using the same transfer protocol, on a single transmit channel 154, as depicted, or multiple transmit channels. Read data is transferred from the receiving device 152 to the sending device 150, using the same signaling protocol, on a receive channel 156. Every bus transfer protocol can be broken down into the fundamental operation of a sending device 150 and a receiving device 152 which communicate by transmitting information across a transmit channel 154 and a receive channel 156. In a time division multiplexed fashion, different types of information may be broadcast from the sending device 150 to the receiving device 152.

In the scalable architecture, the sending device 150 may transmit information comprising an address, transfer qualifiers, write data or write data enables on the transmit channel 154 to initiate a read or write transfer, or any combination thereof, by broadcasting the address, or addresses, on the transmit channel 154 during an address tenure. In the case of a write transfer, the address, transfer qualifiers, write data and write data enables are all transferred on the transmit channel 154 and the receive channel 152 is not used. In the case of a read transfer, the address and transfer qualifiers are transmitted on the transmit channel 154. The receiving device 152 acknowledges this broadcast and subsequently provides the requested data by broadcasting the read data on the receive channel 156.

Figure 4:
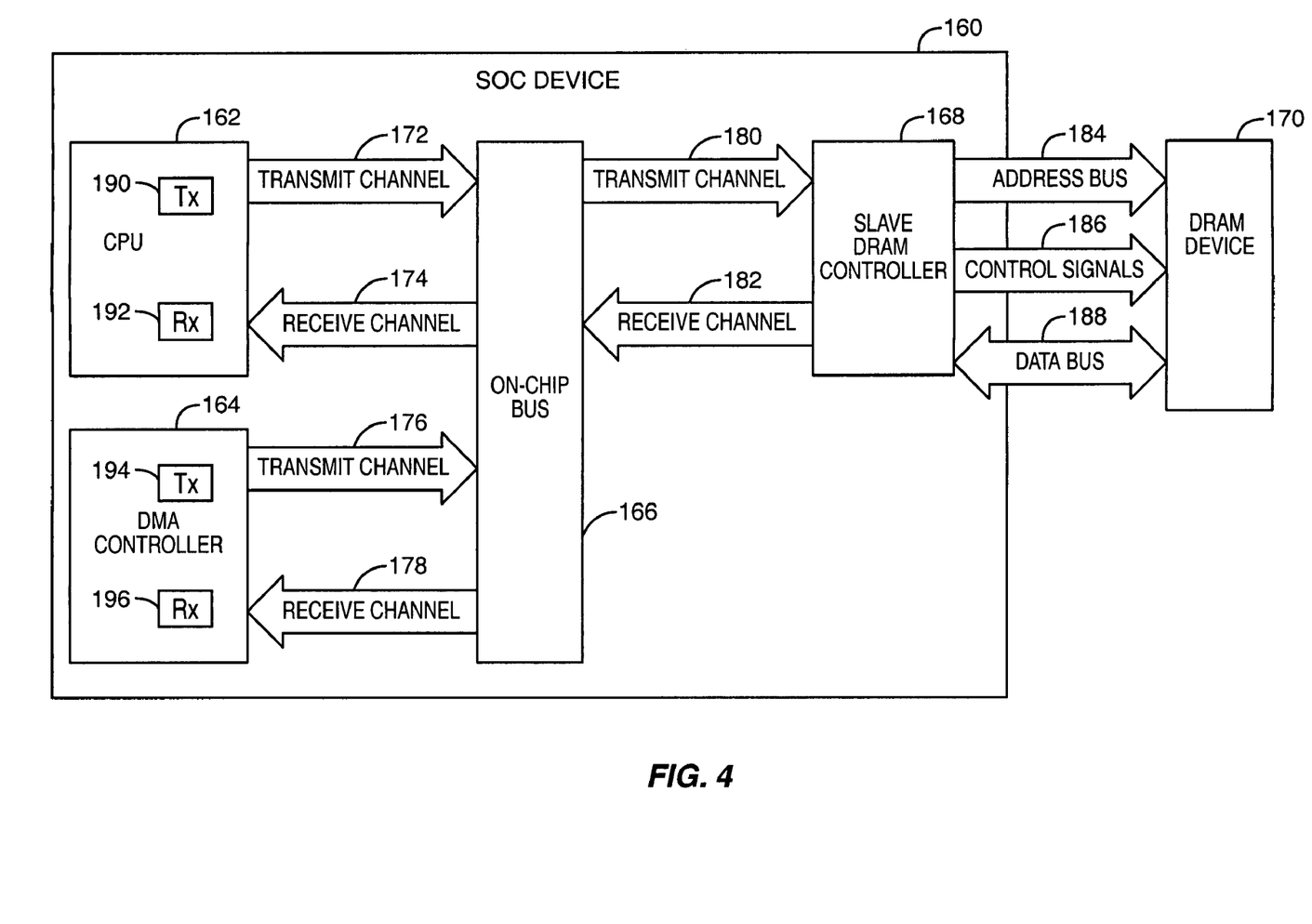
FIG. 4 is a block diagram of a single-chip computer implementing the scalable bus architecture.

FIG. 4 depicts a representative SOC design utilizing the scalable bus architecture. The system 160 includes two master devices, a CPU 162 and a DMA Controller 164, that read and write data from and to a slave device, the DRAM Controller 168. The data transfers occur across an on-chip bus interconnect 166. The CPU 162 connects to the on-chip bus 166 by a transmit channel 172 and a receive channel 174. Similarly, the DMA Controller 164 connects to the on-chip bus 166 by a transmit channel 176 and a receive channel 178. In turn, the on-chip bus 166 connects to the slave DRAM Controller via transmit channel 180 and receive channel 182. The DRAM Controller 168 reads and writes off-chip DRAM 170 via a conventional interface comprising an address bus 184, control signals 186, and a bi-directional data bus 188.

The transmit channels 172, 176, and 180 transmit the address tenures, transfer qualifiers, and the write data tenures. The receive channels 174, 178, and 182 carry the read data tenures. The on-chip bus 166 is an interconnect that connects the bus channels 172, 174 or 176, 178 of the granted master device 162, 164, respectively, to the corresponding bus channels 180, 182 of the slave device 168. An arbiter (not shown), which may for example reside in the on-chip bus interconnect 166, performs arbitration between the master devices 162, 164, precisely allocating the on-chip bus 166 bandwidth between them by considering transfer direction and/or bus channel bandwidth consumed.

In one embodiment, the CPU 162 includes a transmit channel weighting register 190 and a receive channel weighting register 192. Similarly, the DMA Controller 164 includes a transmit channel weighting register 194 and a receive channel weighting register 196. The values in the weighting registers 190-196 determine the arbitration priority of the master devices 162, 164, for the respective transmit and receive bus channels. The weighting registers 190-196 are periodically loaded with initial values reflecting each master device's allocated relative proportionate share of the on-chip bus 166 bandwidth for each channel.

In one embodiment, upon granting the bus 166 to a master device 162, 164 to perform a write operation, the granted master's transfer channel weighting register 190, 194 is decremented by one for the address tenure, decremented a second time for the transfer qualifier transfer, and is then decremented once for each write data transfer, or beat, across the transmit channel 172, 176, 180. For a read operation, the granted master's receive channel weighting register 192, 196 is decremented by one for each data beat on the receive channel 174, 178, 182. In addition, the granted master's transmit channel weighting register 190, 194 is decremented by one for the address tenure and one for the transfer qualifier transfer across the transmit channel 172, 176, 180.

In this manner, the transmit and receive channel weighting registers 190-196 are decremented based on the precise number of transfers across each of the transmit channel 172, 176, 180 and receive channel 174, 178, 182 that are required to complete the bus transaction. In decrementing the weighting registers 190-196 this way, the system may precisely control the bandwidth allocated to each of the masters on both the transmit and receive channels 172-182.

In another embodiment, for a write operation, the granted master's transmit channel weighting register 190, 194 is decremented only for write data beats across the transmit channel 172, 176, 180, and its receive channel weighting register 192, 196 is decremented only for read data beats on the receive channel 174, 178, 182. In this embodiment, the address tenure and transfer qualifier transfers on the transmit channel 172, 176, 180 for both read and write operations are considered system overhead and are not specifically tracked in bus bandwidth allocation among master devices 162, 164 in performing bus arbitration. This provides a less accurate bandwidth allocation control mechanism, but may simplify implementation and reduce control overhead.

In one embodiment, a single bus weighting register in each master device 162, 164 may be decremented for each information transfer beat, or only for each data beat, in either direction across the on-chip bus 166, thus tracking overall bus utilization but not the separate utilization of the transmit channel 172, 176, 180 and receive channel 174, 178, 182. In another embodiment, each master 162, 164 may include a separate transmit channel weighting register 190, 194 and receive channel weighting register 192, 196; however, the registers 190-194 are decremented only once upon the respective master device 162, 164 being granted the on-chip bus 166 for the relevant data transfer. In this embodiment, the master device's utilization of the on-chip bus 166 is tracked separately for each direction of data transfer, but the length of each such transfer—and hence the master device's actual consumption of the bus 166 bandwidth is not tracked.

Figure 5:
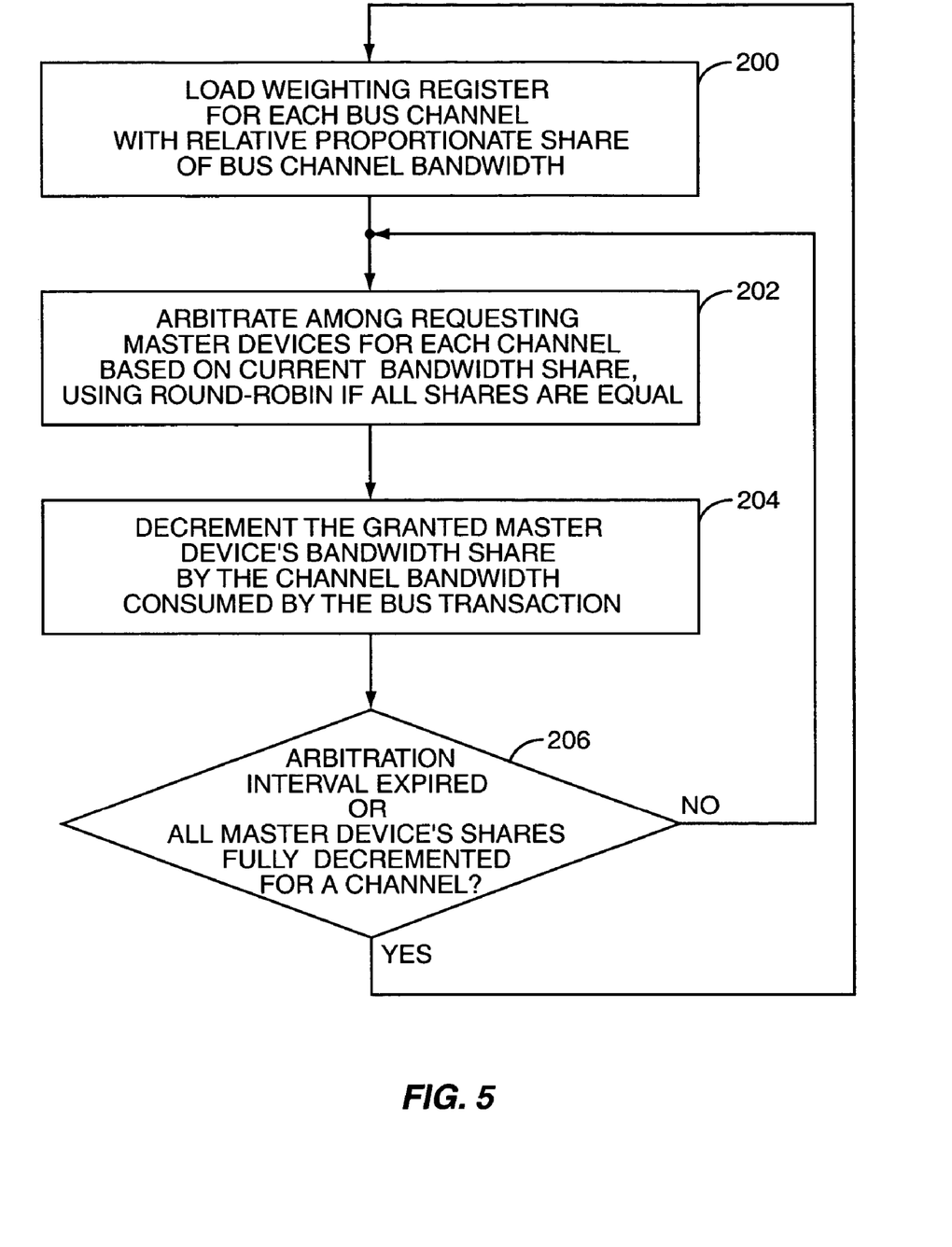
FIG. 5 is a flow diagram of a method of bus arbitration.

FIG. 5 depicts an arbitration method, according to one embodiment, in flow diagram form. A weighting register for each bus channel is loaded with a relative proportionate share of the bus channel bandwidth (block 200). This may comprise loading a single weighting register, such as for a unified bus, or separate weighting registers for transmit (write) and receive (read) bus channels. One or more registers are associated with each master device that may participate in arbitration for bus transactions on the respective bus channels; these registers hold the proportionate bandwidth share. As master devices request bus transactions on the channels, the arbiter performs arbitration among them, granting the requested bus channel to the master device having the highest current allocated bandwidth share (block 202). In the event all of the master devices requesting a bus channel have the same current allocated bandwidth share, a round-robin arbitration algorithm may be used.

As a master device is granted a bus transaction on a requested bus channel, the associated allocated bandwidth share is decremented by the channel bandwidth consumed by the bus transaction (block 204), either in terms of amount of data transferred or in bus channel beats. At the expiration of an arbitration interval, or alternatively when all master devices' allocated bandwidth shares for a bus channel have fully decremented (block 206), the registers are reloaded with the master devices' relative proportionate allocated bandwidth share (block 200). Otherwise, bus arbitration continues (block 202).

The arbitration methods described herein with respect to one or more embodiments present numerous advantages over prior art bus systems and arbitration methods. The arbitration allows for separate and independent weighting of the read and write data channel bandwidth. In many systems, the read data channel is the limiting factor in overall system performance. Providing a separate weighting factor that is only decremented when read transfers are granted allows for a more precise level of control of the allocation of bandwidth on the read data channel, and thus potentially better overall system performance.

In many on-chip bus architectures it is possible to request multiple beat transfers on either the read or write data channel with a single request tenure (e.g., read and write "bursts"). Decrementing the relevant weighting factors by the number of requested beats allows the weighing factors to represent the number of data tenures required on the read or write data bus instead of the number of address tenures. The weighting factors are more closely aligned with the actual bandwidth on each bus channel and provide an equalizing effect when master devices request bus transactions having a variety of different data transfer sizes.

In some embodiments, the use of separate weighting registers for the read and write bus channels, combined with decrementing the weighting registers based on consumed bandwidth measured in the number of data beats requested, provides a direct correlation between the weighting factors programmed into a master device and the actual bandwidth of the read and write bus channels that will be allocated to that master device. This makes the allocation of bandwidth more precise and allows the programmer more control over the actual bandwidth allocated to each master device.

In many modern on-chip bus structures utilizing a burst protocol with separate address, read data, and write data channels, the address channel is under-utilized, and is not the limiting factor in determining the maximum achievable bandwidth in the system. Rather, the read data channel is often the limiting factor; thus, having the ability to more precisely control the read data channel bandwidth may allow for a more optimal arbitration scheme leading to higher overall system performance.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of performing bus arbitration among a plurality of master devices, comprising:
    allocating a proportionate share of bus bandwidth to each master device;
    tracking each master device's consumption of bus bandwidth by decrementing its allocated share in response to the length of bus transactions performed by the master device; and
    using each master device's remaining bandwidth share as a priority in arbitration for the bus.

2. The method of claim 1 wherein the bus comprises separate transmit and receive channels, and wherein a proportionate share of the bandwidth of each channel is separately allocated to each master, decremented in response to the length of bus transactions performed on each channel, and used in arbitration for bus transactions on each channel.

3. The method of claim 2 wherein write operations occur on the transmit channel and read operations occur on the receive channel.

4. The method of claim 2 wherein the bus further comprises a separate address channel.

5. The method of claim 2 wherein address information and write data are transmitted on the transmit channel.

6. The method of claim 1 wherein the length of a bus transaction performed by the master device is measured by a quantity of data transferred in the bus transaction.

7. The method of claim 1 wherein the length of a bus transaction performed by the master device is measured by a number of information transfer cycles required on the bus to perform the bus transaction.

8. The method of claim 7 wherein the length of a bus transaction performed by the master device is measured by a number of data transfer cycles required on the bus to perform the bus transaction.

9. The method of claim 1 further comprising reallocating a proportionate share of bus bandwidth to each master device.

10. The method of claim 9 wherein the reallocation occurs at the expiration of an arbitration interval.

11. The method of claim 10 wherein the arbitration interval is the sum of allocated shares of all master devices, in bus data transfer cycles.

12. The method of claim 10 wherein the reallocation to at least one master device occurs at a higher frequency than the reallocation to at least one other master device.

13. The method of claim 9 wherein the reallocation occurs when all master devices have fully decremented their allocated share of bus bandwidth.

14. The method of claim 1 wherein arbitration is performed on a round-robin basis when all master device's remaining bandwidth share is equal.

15. A method of performing arbitration among a plurality of master devices on a bus having separate transmit and receive channels, comprising:
    independently assigning an arbitration priority for the transmit and receive channels to each master device; and
    independently decrementing each master device's transmit and receive channel priority in response to a bus transaction performed by each respective master device on each respective channel.

16. The method of claim 15 wherein the arbitration priority assigned to each master device for each channel is a relative proportionate share of a channel's bandwidth.

17. The method of claim 16 wherein each channel priority for each master device is decremented in response to an amount of channel bandwidth consumed by each master device.

18. The method of claim 17 wherein the consumed bandwidth is measured in an amount of data transferred on a channel in the bus transaction.

19. The method of claim 17 wherein the consumed bandwidth is measured in information transfer cycles on a channel required to perform the bus transaction.

20. The method of claim 19 wherein the consumed bandwidth is measured in data transfer cycles on a channel required to perform the bus transaction.

21. The method of claim 15 further comprising reassigning an arbitration priority for the transmit and receive channels to each master device.

22. The method of claim 21 wherein the arbitration priority for each channel is reassigned at the expiration of an arbitration interval.

23. The method of claim 22 where the arbitration priority for at least one channel is reassigned to at least one master device at a higher frequency than the channel priority is reassigned to at least one different master device.

24. The method of claim 21 wherein the arbitration priority is reassigned to each master device when the priorities for the transmit or receive channel in all master devices are fully decremented.

25. The method of claim 15 wherein the bus comprises a transmit channel transferring write data and write enables, a receive channel transferring read data, and an address channel transferring address and transfer qualifier information.

26. The method of claim 25 wherein the bus comprises a transmit channel transferring write data, write enables, addresses, and transfer qualifier information, and a receive channel transferring read data.

27. The method of claim 15 further comprising arbitrating among master devices requesting the transmit or receive channels using a round-robin arbitration algorithm when the respective channel priorities for all the requesting master devices are the same.

28. A method of performing arbitration among a plurality of master devices on a bus having separate transmit and receive channels, each master device associated with a weighting register corresponding to each channel, comprising:
    loading the transmit channel weighting register and receive channel weighting register associated with each master device with a relative proportionate share of bandwidth on the respective channel;
    arbitrating among master devices requesting bus transactions on the bus channels based on current bandwidth share as reflected by the contents of the weighting registers;
    when a master device is granted access to a bus channel, decrementing the weighting register corresponding to that channel associated with the granted master device, by the bus channel bandwidth consumed in the granted bus transaction.

29. The method of claim 28, wherein arbitrating among requesting master devices comprises, if all weighting registers corresponding to the requested bus channel are equal, employing a round-robin arbitration algorithm.

30. The method of claim 28, further comprising periodically reloading the weighting registers with a relative proportionate share of bandwidth on the respective channel.

31. The method of claim 30 wherein the weighting registers are reloaded at the expiration of an arbitration interval.

32. The method of claim 30 wherein the weighting registers are reloaded when all weighting registers for a bus channel are fully decremented.

33. An electronic device, comprising:
    a data transfer bus;
    at least two master devices connected to the bus in data transfer relationship;
    at least one slave device connected to the bus in data transfer relationship;
    an arbitration priority register associated with each master device, the arbitration priority register operative to be loaded with an initial value and operative to decrement, in response to the master device being granted a bus transaction on the bus, by an amount reflecting the bus bandwidth consumed by the bus transaction; and
    a bus arbiter operative to grant the bus to the requesting master device with the highest value in its associated arbitration priority register.

34. The device of claim 33, wherein the bus arbiter is further operative to grant the bus to a requesting master device on a round-robin basis when the values in arbitration priority registers associated with all requesting master devices are equal.

35. The device of claim 33, wherein the data transfer bus comprises a transmit channel operative to transfer write data and a receive channel operative to transfer read data, and further comprising a separate arbitration priority register for each channel associated with each master device, each register operative to decrement by an amount reflecting the channel bandwidth consumed by a bus transaction, and wherein the arbiter arbitrates for each channel.

36. The device of claim 35, wherein the transmit channel is further operative to transfer addresses.

37. The device of claim 33 wherein the arbitration priority register is further operative to be reloaded.

38. The device of claim 37 wherein the arbitration priority register is operative to be reloaded at the expiration of an arbitration interval.

39. The device of claim 37 wherein the arbitration priority register is operative to be reloaded when all of the arbitration priority registers for the transmit or receive channels are fully decremented.

40. An electronic device, comprising:
- at least two master devices;
- at least one slave device;
- a transmit bus channel operative to transfer information from a master device to a slave device;
- a receive bus channel operative to transfer information from a slave device to a master device;
- an arbitration priority register for each of the transmit and receive bus channels associated with each master device, the arbitration priority register operative to be loaded with an initial value and operative to decrement in response to the master device being granted a bus transaction on the respective bus channel; and
- a bus arbiter operative to grant a bus channel to the requesting master device with the highest value in its associated arbitration priority register for that channel.

41. The device of claim 40, wherein the arbitration priority register for each channel is operative to decrement by an amount reflecting the associated master device's consumption of bandwidth on that channel in a granted bus transaction.

42. The device of claim 40 wherein the information transmitted from a master device to a slave device on the transmit channel includes addresses.

* * * * *